May 12, 1936.    G. B. ROTH    2,040,534
SOUNDPROOF CONSTRUCTION
Original Filed Oct. 20, 1932    2 Sheets-Sheet 1
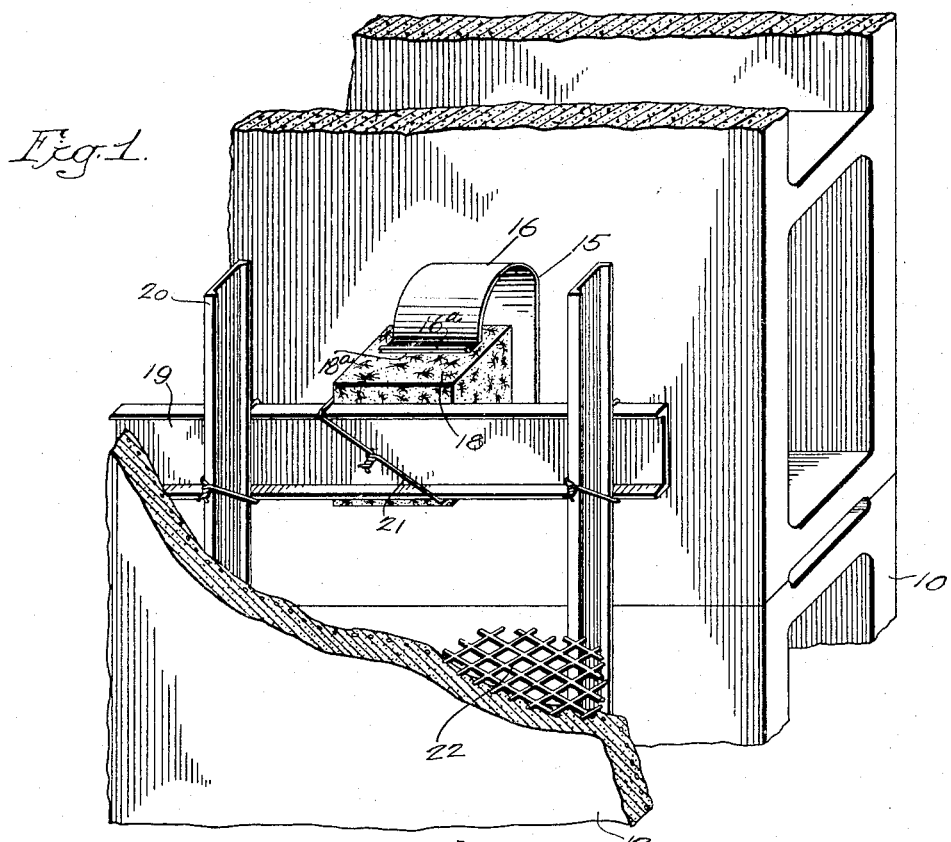
Fig. 1.
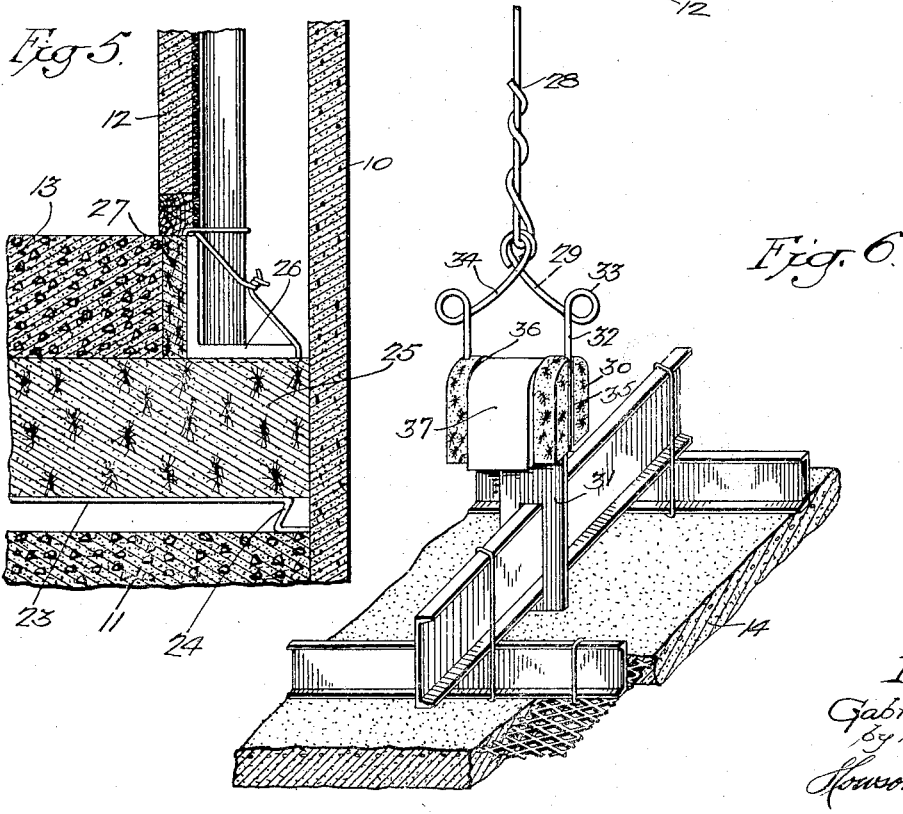
Fig. 5.
Fig. 6.
Inventor:
Gabriel B. Roth
by his Attorneys
Howson & Howson May 12, 1936. G. B. ROTH 2,040,534
SOUNDPROOF CONSTRUCTION
Original Filed Oct. 20, 1932 2 Sheets-Sheet 2

Inventor:
Gabriel B. Roth
by his Attorneys
Howson & Howson

Patented May 12, 1936

2,040,534

UNITED STATES PATENT OFFICE 2,040,534

SOUNDPROOF CONSTRUCTION

Gabriel B. Roth, Philadelphia, Pa.

Application October 20, 1932, Serial No. 638,804
Renewed October 11, 1935

8 Claims. (Cl. 72—16)

This invention relates to sound-proof and vibration dampening constructions, and more particularly to a method of constructing the walls of buildings and the like to prevent transmission of vibrations generated in any compartment or cubicle thereof to a second compartment or cubicle.

An important object of the invention is the provision of a multiple wall construction for buildings in which the inner wall element is supported from the main wall element by a plurality of spaced vibration-dampening devices, each device including a plurality of resilient members arranged in series and having different vibration moments.

A further and more specific object of the invention is the provision of means for providing an effective cork or other non-metallic layer insulation between the main walls of a compartment and the inner walls thereof without the expense attendant upon installation of a solid layer thereof.

A still further object of the invention is the provision of an arrangement for mounting cork or other non-metallic resilient vibration insulating bodies in such manner that their efficiency is increased and the vibration-deadening properties thereof are augmented.

A further, and still more specific object of the invention, is the provision of means for supporting the inner wall sections of room compartments from the outer or main wall sections thereof by the combination of non-metallic resilient material and spring vibration dampening elements.

These and other objects I attain by the construction shown in the accompanying drawings wherein, for the purpose of illustration, I have shown a preferred embodiment of my invention and wherein:

Fig. 1 is a perspective view, partially broken away, of a vertical wall constructed in accordance with my invention;

Fig. 5 is a detail sectional view, showing the junction of the vertical and horizontal wall sections;

Fig. 6 is a perspective view showing the method of supporting the ceiling; and

Figure 2:
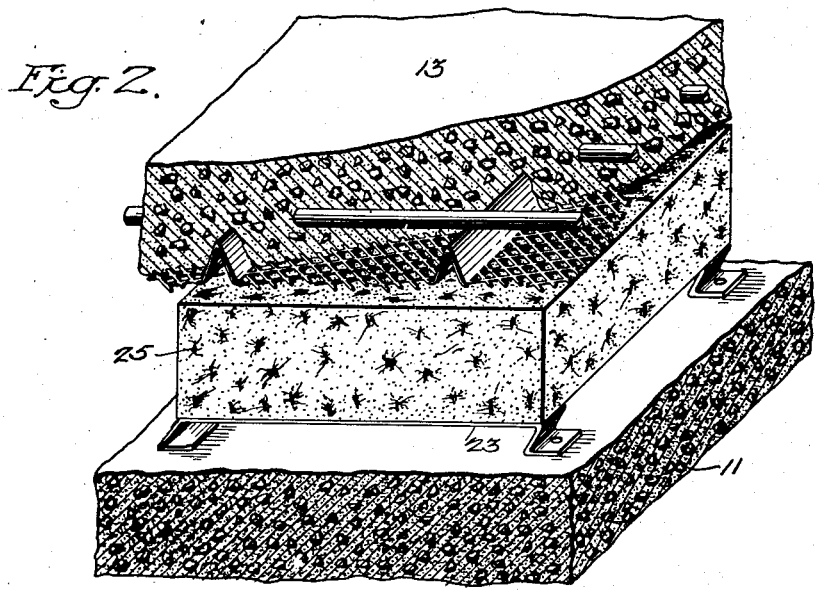
Fig. 2 is a perspective view, partially in section, showing a floor constructed in accordance with my invention.
Figure 3:
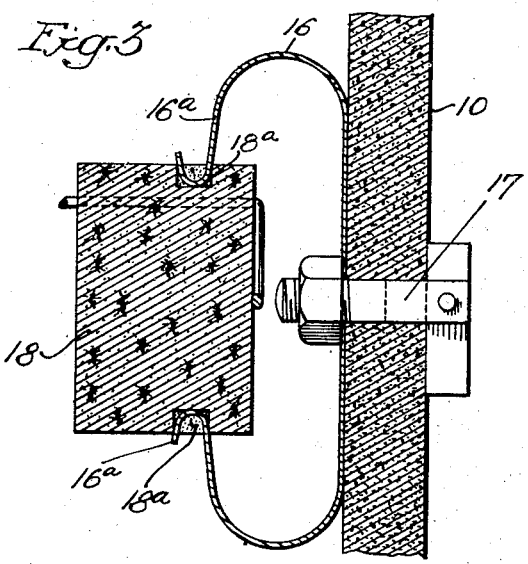
Fig. 3 is a detail sectional view through one of the vertical wall-supporting units.
Figure 7:
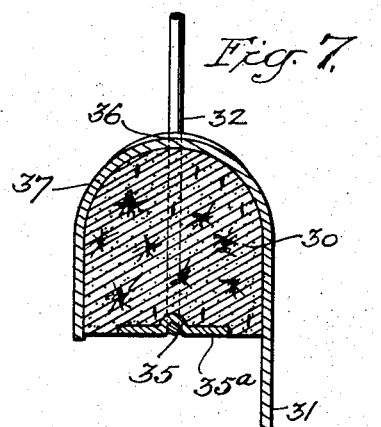
Fig. 7 is a detail sectional view through the ceiling support.

Referring now more particularly to the drawings, the numerals 10 and 11 indicate main wall elements of a building structure, these characters specifically designating a vertical wall and a horizontal wall or floor slab. From the vertical wall 10 an inner wall 12 is supported, while from the 10 ceiling slab 11 are supported both the floor proper 13 and a ceiling 14 below. All of the wall elements hereinbefore described may be of any usual or ordinary construction with a very slight modification, as hereinafter set forth.

Between the vertical wall element 10 and the inner wall element 12 associated therewith I dispose vibration dampening units 15, each comprising a spring metal clip 16, at present shown as secured to the wall 10 by bolts 17 and a cork 20 or other resilient non-metallic block 18 which is engaged between the free end portions of the clip 16 and which is in turn secured to the furring channels against which the inner wall element 12 is placed. The blocks 18 are at present illustrated as cubiform and as having in opposite faces thereof notches 18a receiving the inbent terminals 16a of springs 16.

Figure 4:
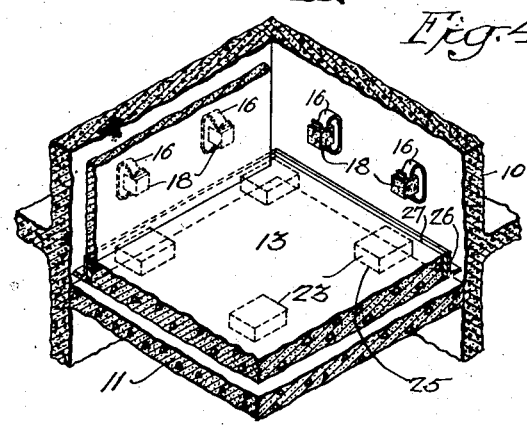
Fig. 4 is a fragmentary perspective, partially diagramatic in nature, illustrating the manner of distributing the vibration dampening elements employed in supporting the inner wall elements.

The furring channels are at present disclosed as including horizontal and vertical elements 19 and 20, of which the horizontal elements are secured to the resilient non-metallic blocks by bonds 21 and the vertical elements are directly secured to the reinforcing 22 of the wall section 12. The lower ends of the vertical channels are seated upon the outermost of a series of vibration dampening elements 23 which are, in turn, seated upon the floor slab 11. Vibration dampening elements 23 each comprise a plurality of spring cleats 24 supporting cork or other resilient non-metallic slabs 25. In the present illustration the vertical furring channels actually engage the slabs 25 through an angle bar 26 forming a sill therefor. As more clearly shown in the semi-diagrammatic view of Fig. 4, the vibration dampening elements 23 are disposed at uniformly spaced points upon the slab 11 and support the floor 13 which is directly imposed upon the cork blocks of the elements. Between the edges of the floor slab 13 and the sills 26 a strip of cork or other nonmetallic insulation 27 is provided so that the wall section 12 is completely insulated from the floor section. The sills 26 are also spaced from the adjacent faces of the main wall sections 10 so that there may be no vibration transmission through these sills to the main wall sections.

The ceiling slabs support, through suitable hangers 28, spring clips 29 which, through cork or other resilient non-metallic blocks 30 and hangers 31, support the ceiling 14. The clips 29 each comprise a substantially U-shaped portion 32, the upper ends of the arms of which have spring loops 33 the terminal portions of which are upwardly and inwardly inclined, as indicated at 34 and provided with suitable elements to engage the hangers 28. The blocks 30 are each provided in the side and bottom faces thereof with grooves 35 to receive the U-shaped portion of the clip. These blocks are preferably further provided in their upper surfaces with grooves 36 to receive the hooked end 37 of the hanger 31. A seat plate 35a is preferably inserted between the bottom of the block and the clip to prevent cutting thereof.

It will be obvious that in each of the vibration dampening organizations employed, the structure includes the resilient non-metallic block and a spring which are mutually interposed between the wall elements connected by the unit. The blocks will, of course, have a vibration dampening moment different from that of the springs so that the efficiency of each of these elements as a vibration dampening element is augmented and the possibility of transmission of sound or other vibration waves from the inner wall elements to the outer wall elements, materially reduced.

It will be obvious that while preferred methods of mounting the non-metallic blocks and their associated springs upon the engaged elements, and preferred means of connecting the springs with the associated blocks have likewise been illustrated, other means can be conveniently employed to accomplish the same ends without in any manner departing from the spirit of my invention. I do not, therefore, wish to be understood as limiting myself to such specific arrangements as illustrated except as hereinafter claimed.

I claim:

1. In a sound-proof wall construction, the combination of outer and inner wall elements and a plurality of spaced vibration dampening devices supporting the inner from the outer wall, each vibration dampening device including a plurality of resilient members arranged in series, said resilient members having different vibration moments and including a non-metallic member engaging said inner wall.

2. In a vibration-dampening wall construction, the combination with inner and outer walls, of a plurality of spaced independent vibration dampening devices supporting the inner from the outer wall, said vibration dampening devices each comprising a non-metallic body and a spring arranged in series and each secured to one of said wall elements and free from engagement with the other wall element.

3. In a sound-proof wall construction, inner and outer wall elements, a spring clip secured to one of said wall elements, a cork block engaged in said clip, the spring clip embracing the cork block and means to support the cork block from the other wall element.

4. In a building construction, a walled compartment, each of the walls of which comprises inner and outer wall elements and a plurality of spaced vibration dampening elements supporting each of the inner wall elements from the corresponding outer wall elements said vibration dampening elements each including a non-metallic element secured to the associated inner wall element.

5. In a building construction, a walled compartment, each of the walls of which comprises inner and outer wall elements and a plurality of spaced vibration dampening elements supporting the inner wall elements from the corresponding outer wall elements, each vibration dampening device including a plurality of resilient elements arranged in series, said resilient elements having different vibration moments including a non-metallic element engaged with the inner wall element.

6. In a sound-proof wall construction, the combination with main vertical and horizontal wall structures, of inner horizontal and vertical wall structures spaced from their respective main wall structures, vibration dampening elements extending between each of said main wall structures and the corresponding inner wall structure to support the same, certain of the vibration dampening elements associated with the horizontal wall structures projecting toward the vertical wall structure from the adjacent edge of the inner horizontal wall structure to afford a seat for the lower end of the inner vertical wall structure.

7. In a sound-proof wall construction, the combination with main vertical and horizontal wall structures, of inner horizontal and vertical wall structures spaced from their respective main wall structures, vibration dampening elements extending between each of said main wall structures and the corresponding inner wall structure to support the same, certain of the vibration dampening elements associated with the horizontal wall structures projecting toward the vertical wall structure from the adjacent edge of the inner horizontal wall structure to afford a seat for the lower end of the inner vertical wall structure, and sound insulation interposed between the lower end of the vertical wall structure and the opposed edge of the inner horizontal wall structure.

8. In a vibration-dampening wall construction, the combination of outer and inner wall elements, and a plurality of spaced vibration-dampening devices supporting the inner from the outer wall, each vibration dampening device including a plurality of resilient members arranged in series, said resilient members having different vibration moments and including a non-metallic member engaging one of said walls and free from engagement with the other thereof.

GABRIEL B. ROTH.